May 2, 1967  P. CANNON  3,317,035
GRAPHITE-CATALYST CHARGE ASSEMBLY FOR THE
PREPARATION OF DIAMOND

Filed Sept. 3, 1963  3 Sheets-Sheet 1

Inventor:
Peter Cannon,
by Leo J. MaLossi
His Attorney.

Inventor:
Peter Cannon,
by Leo J. MacLean
His Attorney.

May 2, 1967 P. CANNON 3,317,035
GRAPHITE-CATALYST CHARGE ASSEMBLY FOR THE
PREPARATION OF DIAMOND
Filed Sept. 3, 1963 3 Sheets-Sheet 3
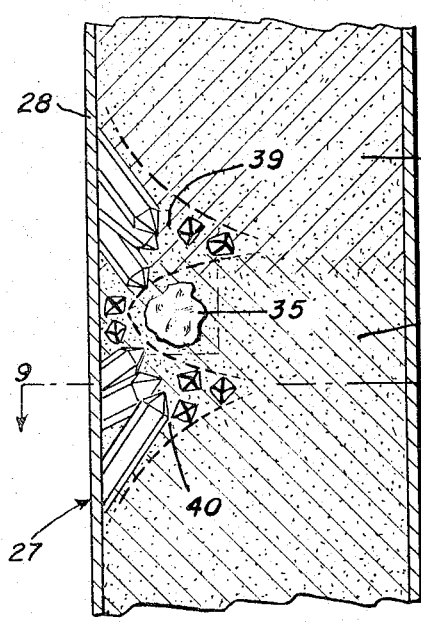
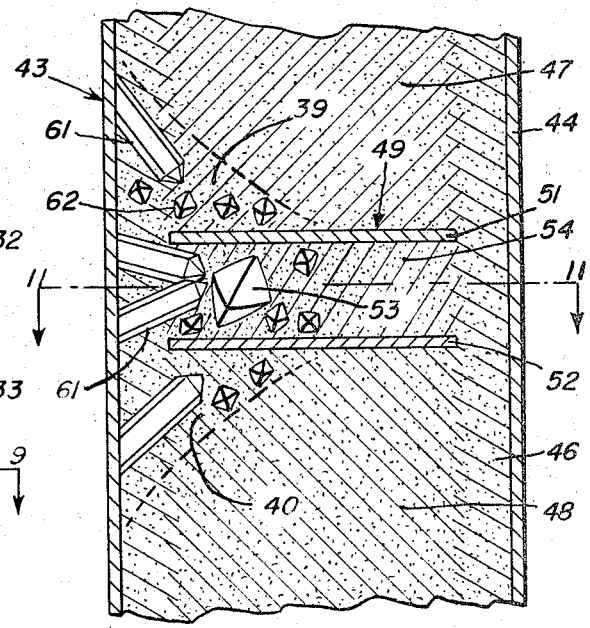
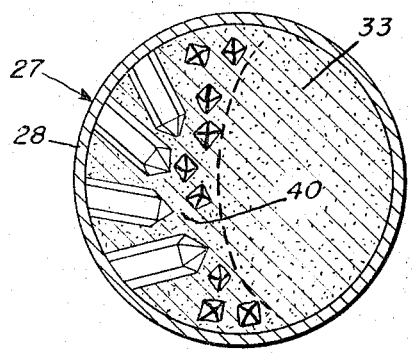
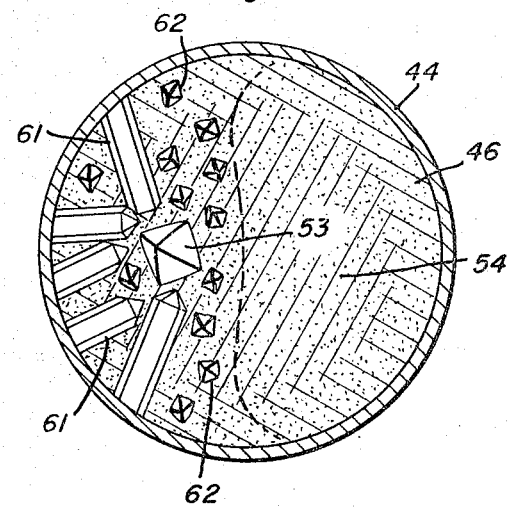
Inventor:
Peter Cannon,
by Leo J. MaLossi
His Attorney.

United States Patent Office 3,317,035
Patented May 2, 1967

3,317,035
GRAPHITE-CATALYST CHARGE ASSEMBLY FOR
THE PREPARATION OF DIAMOND
Peter Cannon, Alplaus, N.Y., assignor to General Electric
Company, a corporation of New York
Filed Sept. 3, 1963, Ser. No. 306,069
11 Claims. (Cl. 206—47)

This invention relates to diamond growth, and more particularly to a method and apparatus for producing diamond crystals of improved quality and of larger size.

The conversion of graphite to diamond under the action of high pressures and high temperatures may be carried on in a variety of apparatus at various temperatures and pressures within reasonably well-defined ranges depending upon the catalyst system and the particular arrangement of the reactants in the reaction vessel. It is, however, difficult to produce strong, good quality individual diamond crystals of a size up to about ⅕ carat or larger by known growth processes and arrangements. Individually mounted crystals of this size and of great strength are particularly desirable in tool elements for use in a variety of cutting and grinding applications.

Accordingly, it is an object of this invention to secure the benefits of improved diamond growth.

It is another object of this invention to provide a method and apparatus for improved diamond growth for the preparation of larger diamond crystals and of crystals of good optical clarity and resistance to thermal shock.

It is another object of this invention to provide an improved arrangement of reactants within the reaction vessel of a high pressure apparatus to comprise a reaction cell to implement larger diamond growth.

It is a further object of this invention to direct a particular asymmetric or off-center disposition of a hard crystalline inclusion in a matrix of spectroscopically pure graphite within a reaction vessel to initiate indivdual large diamond growth not incorporative of the crystalline inclusion.

Briefly described this invention includes the positioning of a stress-inducing hard crystalline inclusion comprising one component of a novel reaction cell enclosed within a compacted body of spectroscopically pure graphite, which body has a central axis, with this crystalline inclusion disposed therein in an offset, or eccentric, relationship to the aforementioned central axis such that the shortest distance between the crystal and a layer of a catalyst metal covering the major extent of the exterior of the graphite body is in the range of between about 50 and about 100 mils. A second component of the reaction cell is a quantity of catalyst metal present in local volumetric ratio to the volume of the inclusion crystal in the range of between 1:10 to 6:1. The minimum amount of localized concentration of catalyst metal must be enough to provide a thin unbroken film in the molten state on at least two sides of the inclusion crystal. In the case of $C_{di}$ (carbon in the diamond form) used as an inclusion the range of localized catalyst required may also be expressed as an atomic ratio of catalyst to $C_{di}$ from about 1:10 to about 2.5:1.

This invention will be better understood when considered in connection with the following description and the drawings in which:

FIG. 8 is a schematic indication of diamond formation in the wedge-shaped yield zones of disproportionate increase in pressure gradient and the disposition of the zones above and below the plane of the inclusion crystal and extending to about halfway across the charge element;

FIG. 9 is a sectional view taken on line 9—9 of FIG. 8 showing the crescent shape of the yield zones;

FIG. 10 is a schematic representation showing the yield zones and the increased concentration of diamond formation between the catalyst discs with the embodiment of FIG. 7; and FIG. 11 is a sectional view on line 11—11 of FIG. 10.

A suitable process for the conversion of non-carbon diamond to diamonds is outlined in U.S. Patents 2,947,610—Hall et al. and 2,947,609—Strong. Briefly, the process includes combining a suitable non-diamond carbonaceous material, usually graphite, together with a catalyst metal comprising at least one of the metals of Group VIII of the periodic table of elements, chromium, manganese or tantalum. The graphite-catalyst combination is then subjected to pressures and temperatures which are above the graphite-to-diamond equilibrium (Berman-Simon) line on the phase diagram of carbon, and in the range where the catalyst is effective to provide transformation or conversion of graphite to diamond.

Figure 1:
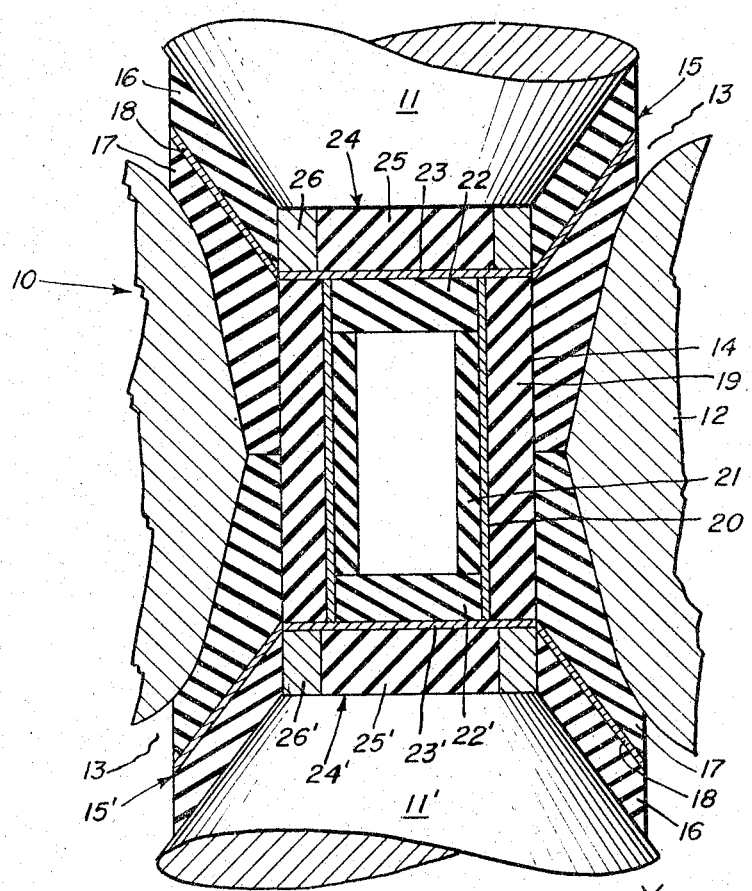
FIG. 1 is an elevational view in section of a preferred apparatus wherein the process of this invention may be carried out.

One preferred form of high pressure, high temperature apparatus in which the diamond growth process of this invention may be practiced is the subject of U.S. Patent 2,941,248—Hall, this apparatus being illustrated in FIG. 1 herein. Thus, as shown in FIG. 1, apparatus 10 includes a pair of punches 11 and 11' and an intermediate "belt" or die 12. Each punch is surrounded by a plurality of press-fitted binding rings (not shown) which reinforce the punches, and a soft steel outer safety ring (not shown). Die member 12 includes an aperture 13 in which there is positioned a reaction vessel 14. Between each punch 11 and 11' and die 12, there are included gasket assemblies 15 and 15', respectively. Each gasket assembly, for example assembly 15, comprises a pair of conical pyrophyllite gaskets 16 and 17 and a conical metallic gasket 18 interposed therebetween.

Motion of either one of punches 11 and 11' towards the other will compress the gasket assemblies 15 and 15' and thereafter will compress the reaction vessel 14 disposed therebetween raising the pressure in the specimen in reaction vessel 14 to a very high value. At the same time, electrical current is provided from a source, not shown, to flow via punch 11 and 11' through a suitable resistance heater (to be described below) in the reaction vessel 14, to heat the specimen.

Reaction vessel 14 is of the general type disclosed in U.S. Patent 3,031,269—Bovenkerk. In one preferred form the outer element of vessel 14 is hollow pyrophyllite cylinder 19 approximately 0.930 inch in length. Positioned concentrically within and adjacent to cylinder 19 is graphite electrical resistance heater tube 20 having a wall thickness of approximately 0.025 inch. Within graphite tube 20 there is concentrically positioned the shorter alumina liner, or cylinder, 21. Opposite ends of liner 21 are fitted with a pair of alumina plugs 22, 22' effectively closing the ends of alumina tube 21. Electrically conductive metallic end discs 23 and 23' arranged at each end of the cylinder 19 are in contact with tube 20 and conduct electricity to heater tube 20. Adjacent each disc 23 and 23' is an end cap assembly 24, 24' each comprising a pyrophyllite plug or disc 25, 25' surrounded by an electrically conductive ring 26, 26', the latter completing the electrical circuit between punches 11 and 11' and graphite heater 20 via discs 23 and 23'.

In the general graphite-to-diamond process reaction vessel 14, or more particularly liner 21, has inserted therein a charge element of graphite and catalyst metal in which, when it is subjected to sufficiently high pressures and high temperatures, graphite is converted to diamond.

It has been discovered that by the use of a reaction cell within the charge element 27 having an inclusion crystal of a hard substance inert to the graphite to diamond reaction as one component thereof with this crystal located in the graphite-catalyst charge element 27 offset from, or eccentric to, the central axis x—x of charge element 27, larger, strong individual diamond crystal growth results extending from the catalyst metal wall of the charge element inwardly toward the crystalline inclusion.

Figure 2:
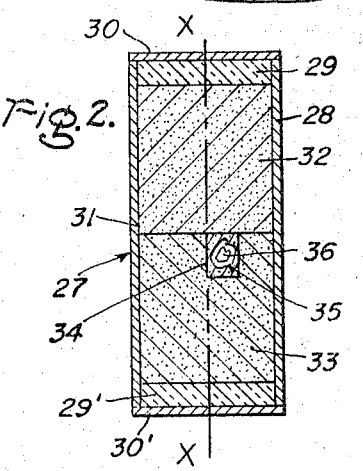
FIG. 2 is a vertical cross-section of one embodiment of a charge element of graphite and catalyst to be inserted in the apparatus of FIG. 1 employing a first arrangement of the reaction cell of the present invention.

One preferred example of such an arrangement of reaction materials is illustrated in FIG. 2. In FIG. 2, there is shown one construction of charge element, or insert assembly, 27 which is adapted to fit concentrically in liner 21. The outer wall of charge element 27 is a thin-walled nickel tube 28 (0.010 inch wall thickness and 0.318 inch O.D.) dimensioned for a close fit within the 0.320 inch I.D. of liner 21. Closing the ends of tube 28 are cylindrical discs 29, 29' usually made of the same material as liner 21, for example alumina. Nickel discs 30, 30' are then placed over discs 29, 29', respectively, concentrically therewith and with tube 28. Tube 28 is filled with a body of graphite of spectroscopic purity, as by inserting graphite rod 31 machined to fit closely within tube 28. Formation of rod 31 in two sections 32 and 33 as shown is effected in order that one of the sections may be conveniently provided with a suitable pocket, or recess, 34 in which reaction cell 35 will be positioned.

Figure 3:
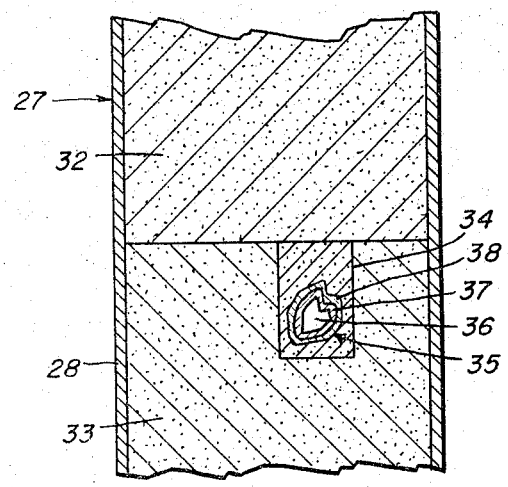
FIG. 3 is an enlarged sectional view of the arrangement of the components of the reaction cell shown in FIG. 2 prior to the conversion of graphite to diamond.

In the reaction cell 35 of FIGS. 2 and 3, a crystalline inclusion 36 such as a diamond crystal of about 2 or 3 millimeters in longest dimension is placed in recess 34 after carefully wrapping crystal 36 to provide a localized concentration of catalyst metal therewith. In this arrangement the catalyst metal chosen being nickel it was found that a modifying material, such as aluminum is desirable and crystal 36 is, therefore, shown wrapped first in aluminum foil 37 having a thickness of about 1 mil and thereafter wrapped in nickel foil 38 having a thickness of about 2 to 3 mils. In this fashion the localized concentration of metals is about 75 percent Ni—25 percent Al. Also, the quantity of nickel as compared to the amount of $C_{di}$ should provide a local atomic ratio between about 1:10 and 2.5:1. Expressed as local volumetric ratio the relationship between the volume of catalyst (Ni) to the volume of inclusion crystal ($C_{di}$) will provide a ratio within the requisite range from about 1:10 to about 6:1.

Diamond is, of course, but one of the materials useable as the stress-inducing crystalline inclusion. Like results are obtainable in the practice of this invention with other hard substances providing that in addition to possessing great hardness these materials also remain inert to the desired graphite-to-diamond reaction. In brief, the materials available for use as inclusion are those melting over 1400° C. and those of such crystalline form that no phase transformation takes place during the application of pressure, since any such transformation will introduce a relaxation and accommodation such as to diminish the desired asymmetric stress distribution. Following is a list of a number of such inclusion materials set forth in order according to an evaluation of the combined qualities of hardness and inertness; diamond, cubic boron nitride, boron carbide, zirconia, thoria, stishovite $SiO_2$, coesite $SiO_2$ and sapphire. Any of these materials may be employed either as crystalline pieces or as inclusions shaped for convenience or to produce a given asymmetry of stress distribution.

In the event a modifying material (such as the aluminum foil in this arrangement) is found desirable, any alloying material not a catalyst to the graphite-diamond reaction or a poison to such catalysts may be used, i.e., copper, silicon, titanium.

The metal-wrapped inclusion crystal 36 is then positioned in recess 34 offset from central axis x—x and in the range of from about 50 to about 100 mils distant from the point on the outer surface of rod 31 (and thereby from the inner surface of nickel tube 28) closest thereto. The space remaining in recess 34 around the metal-wrapped inclusion is packed with additional graphite powder of spectroscopic purity to provide the necessary lateral support to prevent displacement of crystal 36 from its chosen location.

It is an important feature of this invention that the wrapped crystal 36 be positioned in graphite rod 31, and thereby in the reaction vessel 14, in an off-center or eccentric relationship with respect to the central vertical axis x—x of charge element 27. Vertically of rod 31, crystal 36 is preferably located near the mid-height thereof.

Thus, in a case in which the inside diameter of the nickel tube 28 is about 300 mils, the remaining distance between the crystal 36 and the portion of wall 28 nearest thereto would be about 100 mils.

The new diamonds that grow within the arrangement shown in FIGS. 2 and 3 may, and usually do, start from inside the catalyst-metal tube 28 both from above and below the inclusion crystal 36 when charge element 27 is assembled in the apparatus of FIG. 1 and subjected to a pressure in the range of about 40 to about 60 kilobars (1 kb.=987 atm.) and a temperature in the range from about 1200 to about 1400° C. Spontaneous diamond nucleation apparently takes place in the zones 39 and 40 (FIGS. 8 and 9) between the crystal 36 and the inner surface of nickel tube 28 with the diamond growth proceeding inwardly toward the crystal 36 from the inner surface of tube 28. The approximate extent of these zones 39 and 40 of diamond growth is shown schematically in FIGS. 8 and 9.

These spontaneously formed diamond crystals on the wall are much larger than the minor self-nucleation which is found to occur thereon when the charge element 27 is located on axis x—x rather than offset therefrom. Also, although diamonds as large as 1 carat have been produced from the increase in size of a diamond crystal employed as a seed and located along the major axis x—x, such diamonds are weak and cannot be used successfully in industrial applications wherein reliance is placed upon single diamonds.

In the practice of this invention, individual spontaneous columnar diamond growth has been produced measuring about 3 millimeters on a face and as large as ⅕ carat in weight. Depending upon the temperature and pressure conditions employed, dodecahedral diamond crystals and diamond crystals having a larger number of faces may be produced alone or in addition to the larger columnar diamonds. It has been found that the non-columnar diamonds though often smaller in size (in the desirable range of from 1/100 to ⅕ carat) are of high quality as evidenced by their optical clarity and resistance to thermal shock.

Figure 4:
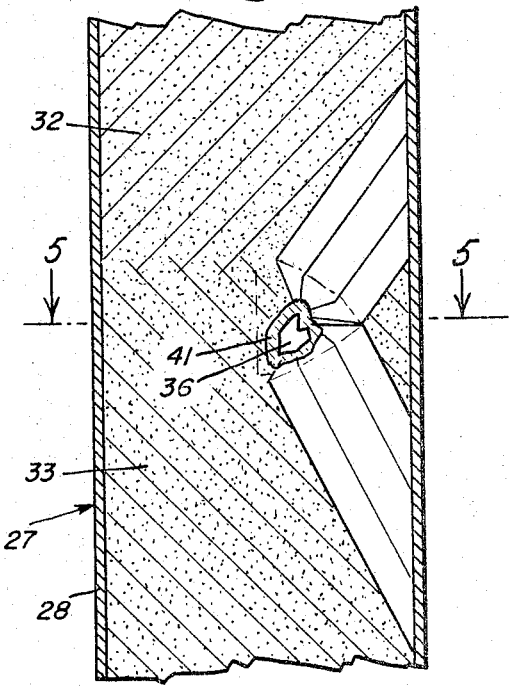
FIG. 4 shows the arrangement of FIG. 3 as viewed in section along line 4—4 of FIG. 5 showing some diamond growth after the application thereto of pressures and temperatures above the graphite-to-diamond equilibrium line of the phase diagram of carbon shown in FIG. 6.
Figure 6:
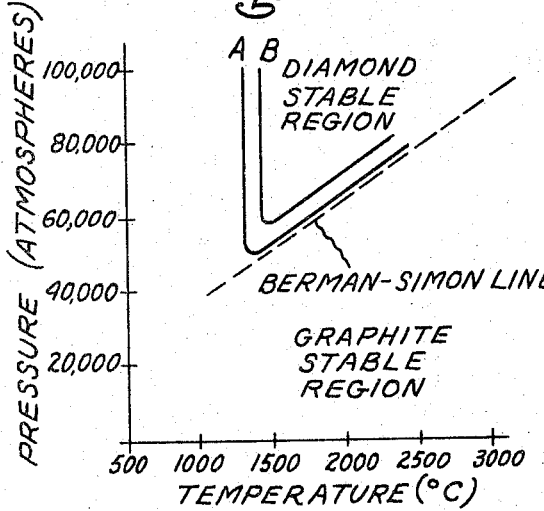
FIG. 6 is a phase diagram of carbon defining two diamond growing regions relative to the graphite-to-diamond equilibrium (Berman-Simon) line.
Figure 5:
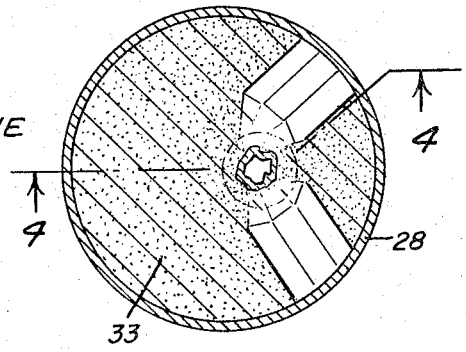
FIG. 5 is a sectional view taken on line 5—5 of FIG. 4.

Although the inclusions remain substantially unaffected by the pressure-temperature application, in one instance in which a diamond crystal was foil wrapped as aforementioned, the new diamond growth (shown in FIGS. 4 and 5 without attempting to show the smaller diamond growth for ease of illustration) appeared to have developed at the expense of further growth of the crystal 36 (shown in FIG. 4 in a mass 41 of re-solidified metal) which in turn became white on the surface and which may actually have suffered some etching and loss of weight.

Normally, thermal and pressure gradients are produced in the charge element during conduct of the process such that the center section of element 27 would appear to be the hottest zone as well as the zone of highest pressure. The purpose of the novel orientation of the inclusion relative to the center-line of graphite body 31 and to the inner surface of the catalyst metal sheath 28 is to accentuate these gradients, particularly the pressure gradients, in the region designated generally as zones 39 and 40 and in effect shifting the position of the maximum pressure gradient thereto and also producing a higher maximum value therefor.

The optimum distance within this operable range of about 50 to about 100 mils distance between the inner surface of tube 28 and crystal 36 (which in turn determines the specific eccentricity in a given arrangement) for locating charge element 27 varies with the particular configuration of the reaction vessel employed and with the chemical nature, e.g., the diffusion parameters of the local catalyst metal and any material for modifying the rate of graphite transport, if such material is employed. Thus, for various configurations and chemical conditions the optimum distance to be employed may be correlated to the maximum size of crystals observed in spontaneous nucleation.

Other materials denoted above as catalysts for the diamond growth reaction may be utilized for tube 28 and/or the outer covering 38 for the inclusion 36. It is preferred in connection with the reactor cell arrangement of FIGS. 2, 3 that that outer metal cover 38 of the crystal 36 be composed of the same metal as that of which tube 28 is composed and that the inner metal foil cover 37 for diamond seed 36 be of aluminum, titanium or of some material having similar behavioral characteristics, not being one of the catalyst metals or a catalyst poison.

Figure 7:
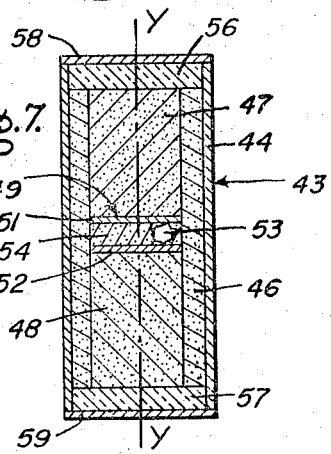
FIG. 7 is a vertical cross-section of another embodiment of a charge element of graphite and catalyst to be inserted in pressure apparatus such as is shown in FIG. 1 employing a different arrangement of the components of a second reaction cell.

Another embodiment of a charge element of graphite and catalyst intended for insertion into reaction vessel 14 or other high pressure apparatus is shown in FIG. 7. In this embodiment a different arrangement of reaction cell components is employed which, however, still provide substantially the same behavioral concepts as the Ni—Al inclusion crystal reaction cell discussed hereinabove so long as the several criteria are adhered to for placement of the stress-inducing crystalline inclusion relative to the catalyst metal exterior of the graphite body and relative to the central axis of the body.

Thus, in the construction in FIG. 7 a thin layer of tantalum forms the outer wall 44 of the charge element 43. For convenience of assembly, tube 46 of spectroscopically pure graphite receiving close-fitting rods 47, 48 of like graphite therein comprises the graphite body of the charge element 27. Between the juxtaposed ends of rods 47 and 48 are placed the components of reaction cell 49, namely, iron discs 51, 52 having the inclusion crystal 53 interposed therebetween packed in powder of the same graphite of spectroscopic purity. By the use of this arrangement a layer of graphite is insured between the discs 51, 52 and tantalum tube 44.

As in the case of reaction cell 35, the crystal 53 is located in the space 54 offset from central axis y—y and spaced from that portion of the inner surface of wall 44 closest thereto a distance in the range of from about 50 to about 100 mls. When iron is used as the local catalyst metal, there is no need to employ a material such as aluminum to modify the rate of graphite transport, however, the same relationship between the quantity of local catalyst metal, in this case iron in the form of discs 51, 52, and the quantity of stress-inducing inclusion in the form of the crystal 53 must be retained. Thus, the volumetric ratio between these two materials should be in the range of between 1:10 and 6.0:1. With respect to the orientation of the local catalyst metal relative to the seed diamond, the catalyst metal should be disposed on at least two sides thereof.

The construction of charge element 43 is completed by alumina plugs 56, 57 and overlying end plates 58, 59 of tantalum.

As shown in FIGS. 10 and 11 by schematic representation the diamond formation is more concentrated in the region between iron discs 51, 52 but, nevertheless diamond growth does occur outside space 54 in zones in characteristic crescent, wedge-shaped yield regions similar to zones 39 and 40. As is indicated both larger columnar crystals 61 and smaller high quality crystals 62 are formed.

Following is a series of examples to provide further guidance in the practice of this invention; the first, second and fourth of these runs were conducted using the reaction cell configuration 35 and the third run was made using the reaction cell configuration 49.

By the conduct of these tests as described it has been established, therefore, that the results indicated herein are reproducible and provide many-faceted diamonds of high quality and columnar diamond crystals of sizes up to 1/3 carat, larger than would be produced by the placement of the crystalline inclusion in the normal region of highest pressure and temperature (coincident with the central axis of the reaction vessel) as has been done in the past.

*Example 1*

A polycrystalline diamond inclusion was wrapped in nickel and aluminum foils so that the local atomic ratios of Ni, Al and $C_{d1}$ were 3:1:3. This inclusion was placed in a hole 177 mils in diameter in a graphite rod 320 mils in diameter, the hole being offset from the major axis so that the least distance between hole and rod edge was 50 mils. The rod was placed in a nickel tube 10 mils thick and exposed to conditions of about 1450° C. and 55 kb. for 50 minutes in high pressure equipment. The diamond became covered with a white overgrowth, and between it and the nickel wall a 1/6 carat columnar diamond was formed.

*Example 2*

The experiment described above in Example 1 was repeated with another diamond inclusion, the applied pressure being changed to about 50 kb. Another large columnar (about 1/6 carat) was formed between the inclusion and the wall.

*Example 3*

An experiment like those above was conducted except that a diamond inclusion crystal resting between iron foil discs about 250 mils in diameter was placed in a graphite tube 20 mils thick between graphite rods within a tantalum tube of 300 mils I.D. and 10 mils thickness. The edge of the inclusion was spaced about 75 mils from the inner surface of the tantalum tube. After exposure to high pressure-high temperature conidtions (50 kb., 1300° C.), large acicular diamonds were found to extend from the tantalum tube where it has been wetted by iron metal over distances of from 50''' to 100''' towards the major axis of the cell. These needle-like diamonds were larger than could be obtained by a similar experiment in which iron discs were permitted to touch the tantalum tube.

*Example 4*

The arrangement employed in Example 1 was employed using a piece of sapphire about 100 mils in longest dimension. The crystal was wrapped first in aluminum foil and then in nickel foil, each piece of foil measuring one square centimeter and 1 mil in thickness. The sapphire inclusion was located in the graphite rod in the manner and relationship described in Example 1. The charge element was exposed to 1400° C. and 55 kb. for 15 minutes. Two large diamond crystals each about 1/10 carat in weight together with numerous well-formed, clear diamond crystals of slightly less than 1/100 carat developed in a wedge shaped zone extending from the wall of the enclosing nickel tube above and below the inclusion in the manner shown in FIGS. 8 and 9.

While a specific method and apparatus in accordance with this invention is described and shown, it is not intended that the invention be limited to the particular description nor to the particular configurations illustrated, and it is intended by the appended claims to cover all modifications within the spirit and scope of this invention.

What I claim as new and desire to secure by Letters Patent of the United States is:

1. In a graphite-catalyst charge element arrangement for insertion in high pressure apparatus for the conversion of graphite to diamond by application thereto of high pressures and high temperatures above the graphite-to-diamond equilibrium line on the phase diagram of carbon wherein spectroscopically pure graphite is partially enclosed in an outer thin layer of catalyst metal chosen from the group consisting of one of the metals of Group VIII of the periodic table of elements, chromium, manganese and tantalum, and a hard crystalline inclusion is enclosed within the graphite, the improvement which comprises:
    (a) the crystalline inclusion in the graphite being located offset from the central axis of the catalyst metal enclosure and spaced between about 50 and about 100 mils distant from the inner surface of the outer catalyst metal layer at its closest point
        (1) said crystalline inclusion being selected from the class consisting of diamond, cubic boron nitride, boron carbide, zirconia, thoria, stishovite silicon dioxide, coesite silicon dioxide and sapphire and
    (b) a quantity of a catalyst metal from the above-recited group being located entirely within said graphite,
        (1) said quantity of metal being in a volumetric ratio of between 1:10 and 6:1 to the volume of crystalline inclusion present and being localized about said crystalline inclusion on at least two sides thereof having graphite disposed between said quantity of catalyst metal and said catalyst metal layer.

2. The improvement substantially as recited in claim 1 wherein the crystalline inclusion is wrapped in a first foil of a metal that is not included in the group of catalyst metals recited and then the foil-wrapped crystal is again wrapped in a second foil of a metal that is included in the group of catalyst metals recited.

3. The improvement substantially as recited in claim 1 wherein the crystalline inclusion is disposed between a pair of iron discs to provide the catalyst metal located entirely within the graphite.

4. The improvement substantially as recited in claim 1 wherein the catalyst metal enclosure is a nickel tube and the crystalline inclusion is a diamond crystal wrapped in aluminum foil which in turn is covered with nickel foil as the catalyst metal located entirely within the graphite with the local atomic ratio of nickel (within said graphite) to aluminum to $C_{di}$ is 3:1:3.

5. In a graphite-catalyst assembly for insertion in a reaction vessel to be subjected to pressures and temperatures above the graphite-to-diamond equilibrium line on the phase diagram of carbon the combination comprising:
    (a) a body of graphite having a central axis,
    (b) a localized reaction cell embedded within said body,
        (1) said reaction cell comprising a hard crystalline inclusion and a quantity of material localized on at least two sides of said crystal,
            (a) said quantity of material containing at least one catalyst metal from the group consisting of the metals of Group VIII of the periodic table of elements, chromium, manganese and tantalum and
            (b) said inclusion being selected from the class consisting of diamond, cubic boron nitride, boron carbide, zirconia, thoria, stishovite silicon dioxide, coesite silicon dioxide and sapphire and being located in a position offset from said central axis and at unequal distances from the exterior surface of said body measured in a plane perpendicular to said central axis and passing through said inclusion, the closest distance between said inclusion and said surface being in the range of from about 50 to about 100 mils,
            (c) the amount of catalyst metal present in said quantity of material being such that the local volumetric ratio of catalyst metal to inclusion is between 1:10 and 6:1, and
    (c) a thin layer of catalyst metal from the above-recited group covering the major portion of the exterior surface of said body.

6. The graphite-catalyst assembly substantially as recited in claim 5 wherein the thin exterior layer of catalyst metal is nickel and the inclusion is covered with a nickel foil to provide the catalyst metal in the reaction cell.

7. The graphite-catalyst assembly substantially as recited in claim 5 wherein the thin exterior layer of catalyst metal is tantalum and the quantity of material localized on at least two sides of the inclusion is iron.

8. In a graphite-catalyst assembly for insertion in a reaction vessel to be subjected to pressures and temperatures above the graphit-to-diamond equilibrium line on the phase diagram of carbon the combination comprising:
    (a) a body of spectroscopically pure graphite having a central axis,
    (b) a localized reaction cell embedded within said body,
        (1) said reaction cell comprising a hard crystalline inclusion and a quantity of material disposed on at least two sides of said inclusion,
            (a) said quantity of material containing at least one catalyst metal from the group consisting of the metals of Group VIII of the periodic table of elements, chromium, manganese and tantalum and
            (b) said inclusion being selected from the class consisting of diamond, cubic boron nitride, boron carbide, zirconia, thoria, stishovite silicon dioxide, coesite silicon dioxide and sapphire and being located in a position offset from said central axis at unequal distances from the exterior surface of said body measured in a plane perpendicular to said central axis and passing through said inclusion, the closest distance from said inclusion to said surface being in the range of from about 50 to about 100 mils and
            (c) a thin layer of catalyst metal from the above-recited group covering the major portion of the exterior surface of said body.

9. The graphite-catalyst assembly for insertion in a reaction vessel substantially as recited in claim 8 wherein the crystalline inclusion is wrapped in a first foil of a metal that is not included in the group of catalyst metals recited and then the foil-wrapped crystal is again wrapped in a second foil of a metal that is included in the group of catalyst metals recited.

10. The graphite-catalyst assembly for insertion in a reaction vessel substantially as recited in claim 8 wherein the crystalline inclusion is disposed between a pair of iron discs to provide the catalyst metal located entirely within the graphite.

11. The graphite-catalyst assembly for insertion in a reaction vessel substantially as recited in claim 8 wherein the layer of catalyst metal covering the major portion of the exterior surface of the graphite body is a nickel tube and the crystalline inclusion is a diamond crystal wrapped in aluminum foil which in turn is covered with nickel foil as the catalyst metal located entirely within the graphite with the atomic ratio of nickel (within the graphite) to aluminum to $C_{di}$ is 3:1:3.

References Cited by the Examiner

UNITED STATES PATENTS

| | | | |
|---|---|---|---|
| 2,992,900 | 7/1961 | Bovenkerk | 23—209.1 |
| 3,148,161 | 9/1964 | Wentorf et al. | 252—502 |

OSCAR R. VERTIZ, *Primary Examiner.*

E. J. MEROS, *Examiner.*